United States Patent
Edlund et al.

(10) Patent No.: US 8,028,030 B2
(45) Date of Patent: Sep. 27, 2011

(54) METHOD AND SYSTEM FOR SUPERVISING ELECTRONIC TEXT COMMUNICATIONS OF AN ENTERPRISE

(75) Inventors: Stefan B. Edlund, San Jose, CA (US); Joshua W. Hui, San Jose, CA (US); Christopher M. Johnson, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/125,374

(22) Filed: May 22, 2008

(65) Prior Publication Data

US 2009/0292779 A1    Nov. 26, 2009

(51) Int. Cl.
*G06F 15/16* (2006.01)
(52) U.S. Cl. .......................... 709/206; 709/200
(58) Field of Classification Search .................... 709/206
See application file for complete search history.

(56) References Cited

U.S. PATENT DOCUMENTS

| | | | |
|---|---|---|---|
| 6,065,055 A * | 5/2000 | Hughes et al. ................. | 709/229 |
| 6,073,142 A | 6/2000 | Geiger et al. | |
| 6,151,623 A | 11/2000 | Harrison et al. | |
| 7,069,437 B2 | 6/2006 | Williams | |
| 7,076,527 B2 | 7/2006 | Bellegarda et al. | |
| 7,095,829 B2 | 8/2006 | Claudatos | |
| 7,219,150 B2 * | 5/2007 | Saeidi ........................... | 709/224 |
| 7,299,263 B2 | 11/2007 | Claudatos et al. | |
| 7,359,942 B2 * | 4/2008 | Mizushima et al. .......... | 709/206 |
| 7,496,628 B2 * | 2/2009 | Arnold et al. ................. | 709/206 |
| 7,600,017 B2 * | 10/2009 | Holtzman et al. ............ | 709/224 |
| 7,664,821 B1 * | 2/2010 | Ancin et al. .................. | 709/206 |
| 7,673,001 B1 * | 3/2010 | Battle et al. ................... | 709/206 |
| 7,756,929 B1 * | 7/2010 | Pettigrew et al. ............. | 709/206 |
| 2004/0153515 A1 | 8/2004 | Touboul et al. | |
| 2005/0091385 A1 * | 4/2005 | Nordstrom .................... | 709/228 |
| 2006/0036689 A1 * | 2/2006 | Buford et al. ................. | 709/206 |
| 2006/0129645 A1 | 6/2006 | Witriol et al. | |
| 2007/0079379 A1 * | 4/2007 | Sprosts et al. ................. | 726/24 |
| 2009/0157834 A1 * | 6/2009 | Krishnaswamy ............. | 709/206 |
| 2009/0164233 A1 * | 6/2009 | Arnold et al. ................. | 705/1 |

FOREIGN PATENT DOCUMENTS

| WO | WO 2005081664 | | 9/2005 |
|---|---|---|---|
| WO | WO 2005081664 A2 | * | 9/2005 |

* cited by examiner

*Primary Examiner* — John Follansbee
*Assistant Examiner* — Anthony Mejia
(74) *Attorney, Agent, or Firm* — Gibb I.P. Law Firm, LLC

(57) ABSTRACT

A method and system for supervising electronic text messages in an enterprise allows for storing organizational information related to the enterprise, identifying a source and a target of the electronic text message, invoking communication screens between the identified source and target, each of the invoked communication screens being determined by the organizational information for the identified source and target, analyzing the electronic text message by a set of rules corresponding to said invoked communication screens to provide a supervisory score, and applying supervisory action to the electronic text message based on the supervisory score, including any of blocking transmission, redirecting the electronic text message to a supervisor or a supervisory file, and copying the electronic text message to the supervisory file.

7 Claims, 3 Drawing Sheets

METHOD AND SYSTEM FOR SUPERVISING ELECTRONIC TEXT COMMUNICATIONS OF AN ENTERPRISE

BACKGROUND

1. Field of the Invention

Embodiments of the invention generally relate to a method and system for supervising electronic text communications in an enterprise. More particularly, exemplary embodiments of the invention invoke communication screens, based on organizational information, between an employee and other employees or non-employees; analyze the electronic text messages and contextual information, based on rules corresponding to the invoked communication screens, to provide a supervisory score; and apply supervisory action to the electronic text message based on the supervisory score.

2. Description of the Related Art

Many enterprises are faced with the problem of supervising electronic text communications, such as email, instant messages, and electronic text transcripts of Voice over Internet Protocol (VoIP), to detect potential leaks of inside information, proprietary information, confidential information, or other inappropriate communications. For example, Rule 3010(a) of the National Association of Securities Dealers (NASD) requires its members to establish and maintain a system to supervise the activities of each registered representative, registered principal, and other associated person that is reasonably designed to achieve compliance with applicable securities laws, regulations, and NASD rules. Rule 3010(b)(1) requires NASD members to establish, maintain, and enforce written procedures to supervise the activities of registered representatives, registered principals, and other associated persons that are reasonably designed to achieve compliance with applicable securities laws, regulations, and NASD rules. Rule 3010(c)(1) requires NASD members to conduct a review, at least annually, of the businesses in which they engage to assist in detecting and preventing violations of, and achieving compliance with, applicable securities laws, regulations, and NASD rules. Rule 3010(d)(2) requires NASD members to develop written procedures for the review of incoming and outgoing written and electronic correspondence with the public relating to their investment banking or securities business. For another example, New York Stock Exchange Rule 342 also requires its members to implement supervisory policies and procedures. For another example, Section 15(f) of the Securities Exchange Act of 1934 requires registered brokers and dealers to establish, maintain, and enforce policies and procedures reasonably designed to prevent the misuse in violation of the Act, or the rules or regulations thereunder, of material nonpublic information by such broker or dealer or any person associated with such broker or dealer.

An example in which supervision of text messages may be required involves the equity research department of an investment bank, which periodically releases analysts' reports and recommendations (e.g., buy, sell, or hold) to investors. The investment bank would like to enforce policies and procedures to prevent unauthorized persons, such as persons outside of the bank, persons not within the equity research department, or unauthorized individuals within the equity research department of the bank, from receiving material nonpublic information regarding such reports or recommendations before they are released to investors. For example, the bank would like to prevent the release of such information to its own brokers, who might engage in prohibited trades based on the information before the reports or recommendations are issued.

Another example in which supervision of text messages may be required involves disclosure of information about a sensitive project in an enterprise. For example, suppose that a limited group of employees in an investment bank is working on a project involving a potential merger or acquisition. The bank would like to limit disclosure of material nonpublic information about the possible merger or acquisition to the project group and certain other authorized individuals within the enterprise, for example, a compliance officer or senior executive.

In another example in which supervision of text messages may be required, an individual employee may have a potential conflict-of-interest due to confidential information obtained during his or her previous employment that precludes the employee from being involved with certain transactions. For example, an employee of Firm B, who had formerly worked for Firm A, may be precluded from working on transactions involving commercial customers of Firm A for a period of time. Therefore, Firm B would like to screen the employee from sending or receiving any communications about a transaction involving a Firm A customer.

In yet another example in which supervision of text messages may be required, many financial services firms maintain "watch lists" and "restricted lists" that identify companies about which the firm has material nonpublic information. These financial services firms use watch lists to monitor suspicious trades and detect potential insider trading violations, while they use restricted lists to restrict or prohibit employee trading, proprietary trading, or trade solicitations in securities of the listed companies. Generally, disclosure of watch lists is limited to the firm's compliance and/or legal departments and other specifically authorized individuals, while restricted lists are disseminated more widely to firm employees. The financial services firms would also like to detect and prevent improper communications of material nonpublic information concerning the listed companies.

Conventional monitoring of an employee's electronic text messages may entail automatically storing all or random samples of email identified by sender and recipient, in which the recipient may be another employee or someone outside the enterprise. Some monitoring systems identify and store only email containing selected keywords or pre-defined text patterns, determined by rules, for subsequent review by a manager or compliance officer. Different rules, in these systems, may apply to different employees. Other employee communication monitoring systems may monitor both email and instant messaging.

There remains a need to automatically and more effectively address the problems of detecting and preventing inappropriate and/or illegal disclosures of information via electronic text messages in an enterprise.

SUMMARY

In view of the foregoing, an exemplary embodiment of the invention provides a method of supervising electronic text messages in an enterprise, in which the method includes storing organizational information related to the enterprise, storing one or more communication screens that screen the electronic text messages, each of the one or more communication screens applying a set of rules to analyze the electronic text message, the set of rules being determined by the organizational information, identifying a source and a target of the electronic text message, invoking the one or more communication screens between the identified source and the identified target, each of the one or more invoked communication screens being determined by the organizational information for the identified source and the identified target, analyzing the electronic text message by the set of rules corresponding to the invoked one or more communication screens to provide a supervisory score, and applying supervisory action to the electronic text message based on the supervisory score, the supervisory action including any of blocking transmission of the electronic text message, redirecting the electronic text message to a supervisor or a supervisory file, and copying the electronic text message to the supervisory file.

Another exemplary embodiment of the invention provides the method of supervising electronic text messages in an enterprise, in which the electronic text message comprises one of an email, an instant message, and a Voice over Internet Protocol (VoIP) transcript.

Yet another exemplary embodiment of the invention provides the method of supervising electronic text messages in an enterprise, in which the source is an employee of the enterprise and the target is another employee of the enterprise or a non-employee.

Yet another exemplary embodiment of the invention provides the method of supervising electronic text messages in an enterprise, in which the organizational information includes an identity of an employee and any of a workstation that the employee has access to, a department in which the employee works, and special projects to which the employee is assigned that may have temporary communication restrictions that apply to the employee.

Yet another exemplary embodiment of the invention provides the method of supervising electronic text messages in an enterprise, further including storing the organizational information and the supervisory score as metadata with the electronic text message.

Yet another exemplary embodiment of the invention provides the method of supervising electronic text messages in an enterprise, in which the analyzing further includes combining rules of the set of rules to provide one or more evidence categories, and combining the one or more evidence categories to provide one or more compliance classes, each of the one or more compliance classes having a supervisory score.

Yet another exemplary embodiment of the invention provides the method of supervising electronic text messages in an enterprise, in which each of the rules of the set of rules comprises any of a keyword, an entity, and a pattern of text that are looked for in the electronic text message.

Yet another exemplary embodiment of the invention provides the method of supervising electronic text messages in an enterprise, in which a matched rule has a numerical value, within a fixed range, corresponding to a relative value of truth for the matched rule.

Yet another exemplary embodiment of the invention provides the method of supervising electronic text messages in an enterprise, in which each of the one or more evidence categories has an evidence category score, the evidence category score corresponding to a highest numerical value of one or more matched rules.

Yet another exemplary embodiment of the invention provides the method of supervising electronic text messages in an enterprise, in which the supervisory score, corresponding to the one or more compliance classes, comprises a combination of one or more evidence category scores.

Yet another exemplary embodiment of the invention provides the method of supervising electronic text messages in an enterprise, in which the supervisory score is limited to a fixed numerical range, according to one of logical and arithmetic operations performed on the combination of one or more evidence category scores.

Yet another exemplary embodiment of the invention provides a system for supervising electronic text messages in an enterprise, in which the system includes a source workstation and a target workstation connected to a supervisory system by a network, a supervisory system that includes a memory for storing organizational information related to the enterprise and for storing one or more communication screens that screen the electronic text messages, an analysis engine adapted to identify a source and a target by accessing an electronic text messaging system, to determine, by the organizational information, a set of rules to be applied to the one or more communication screens to analyze the electronic text message, to invoke the one or more communication screens between the identified source and the identified target, each of the one or more invoked communication screens being determined by the organizational information for the identified source and the identified target, to analyze the electronic text message by the set of rules corresponding to the invoked one or more communication screens to provide a supervisory score, and to apply supervisory action to the electronic text message based on the supervisory score, the supervisory action including any of blocking transmission of the electronic text message, redirecting the electronic text message to a supervisor or a supervisory file, and copying the electronic text message to the supervisory file.

Yet another exemplary embodiment of the invention provides a system for supervising electronic text messages in an enterprise, in which the memory stores the organizational information and the supervisory score as metadata with a stored electronic text message.

Yet another exemplary embodiment of the invention provides a system for supervising electronic text messages in an enterprise, in which the analysis engine is further adapted to combine rules of the set of rules to provide one or more evidence categories, and to combine the one or more evidence categories to provide one or more compliance classes, each of the one or more compliance classes having a supervisory score.

Yet another exemplary embodiment of the invention provides a method of supervising electronic text messages in an enterprise, in which the method includes storing organizational information related to the enterprise, identifying a source and a target of the electronic text message, invoking one or more communication screens between the identified source and the identified target, each of the one or more invoked communication screens being determined by the organizational information for the identified source and the identified target, analyzing the electronic text message by a set of rules corresponding to the invoked one or more communication screens to provide a supervisory score, and applying supervisory action to the electronic text message based on the supervisory score, the supervisory action including any of blocking transmission of the electronic text message, redirecting the electronic text message to a supervisor or a supervisory file, and copying the electronic text message to the supervisory file.

Yet another exemplary embodiment of the invention provides a method of supervising electronic text messages in an enterprise, in which the method further includes storing the one or more communication screens, each of the one or more communication screens applying a set of rules to analyze the electronic text message, the set of rules being determined by the organizational information.

Yet another exemplary embodiment of the invention provides a method of supervising electronic text messages in an enterprise, in which the organizational information includes an identity of an employee and any of a workstation that the employee has access to, a department in which the employee works, and special projects to which the employee is assigned that may have temporary communication restrictions that apply to the employee.

Yet another exemplary embodiment of the invention provides a method of supervising electronic text messages in an enterprise, in which the analyzing further comprises combining rules of the set of rules to provide one or more evidence categories, and combining the one or more evidence categories to provide one or more compliance classes, each of the one or more compliance classes having a supervisory score.

Yet another exemplary embodiment of the invention provides a method of supervising electronic text messages in an enterprise, in which each of the rules of the set of rules comprises any of a keyword, an entity, and a pattern of text that are looked for in the electronic text message, and a matched rule has a numerical value, within a fixed range, corresponding to a relative value of truth for the matched rule.

Yet another exemplary embodiment of the invention provides a method of supervising electronic text messages in an enterprise, in which each of the one or more evidence categories has an evidence category score, the evidence category score corresponding to a highest numerical value of one or more matched rules, the supervisory score, corresponding to the one or more compliance classes, comprises a combination of one of more evidence category scores, and the supervisory score is limited to a fixed numerical range, according to one of logical and arithmetic operations performed on the combination of one or more evidence category scores.

These and other aspects of the exemplary embodiments of the invention will be better appreciated and understood when considered in conjunction with the following description and the accompanying drawings. It should be understood, however, that the following descriptions, while indicating preferred and exemplary embodiments of the invention and numerous specific details thereof, are given by way of illustration and not of limitation. Many changes and modifications may be made within the scope of the exemplary embodiments of the invention without departing from the spirit thereof, and the exemplary embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
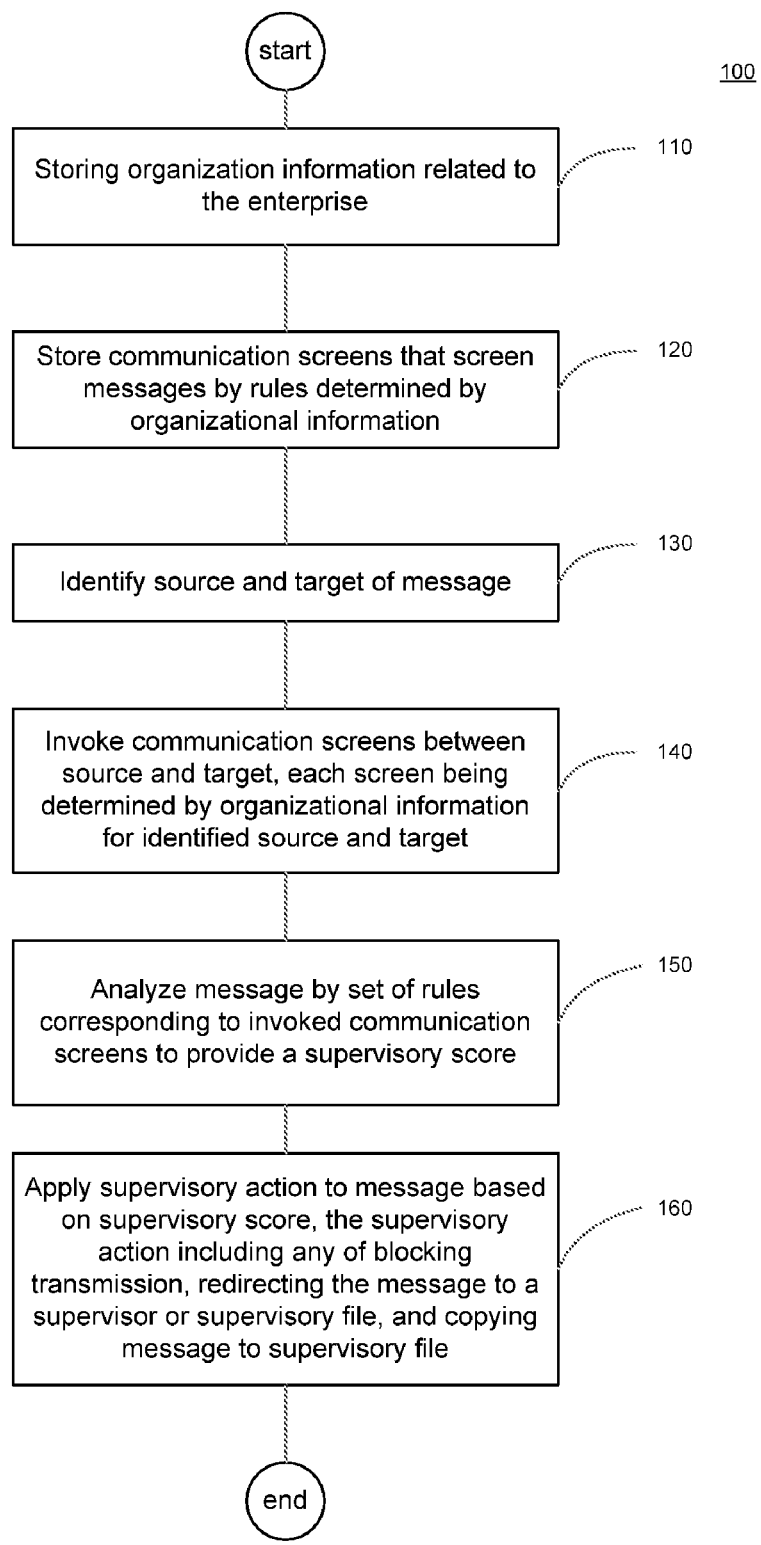
FIG. 1 illustrates a flow diagram illustration a method of supervising electronic text messages in an enterprise in an exemplary embodiment of the invention.

Exemplary embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the exemplary embodiments of the invention. The examples used herein are intended merely to facilitate an understanding of ways in which the exemplary embodiments of the invention may be practiced and to further enable those of skill in the art to practice the exemplary embodiments of the invention. Accordingly, the examples should not be construed as limiting the scope of the exemplary embodiments of the invention.

As stated above, there remains a need to automatically and more effectively address the problems of detecting and preventing inappropriate and/or illegal disclosures of information via electronic text messages in an enterprise.

An exemplary embodiment of the invention may store organizational information, related to the enterprise, in a memory of the supervisory system. The organizational information may include, for example, the identity of an employee and any of a workstation that the employee has authorized access to, a department in which an employee works, and a special project to which the employee is assigned that may have temporary communication restrictions that apply to an employee. The identity of an employee may also be associated with, for example, a password of the employee or biometric data of the employee.

In an exemplary embodiment of the invention, an employee sending an electronic text message identifies a target, i.e., a recipient, of an email, an instant message, or even a VoIP transcript that is to be sent. For example, when sending an email or instant message, the email or instant messaging program may provide the source, i.e., the identity of the employee, of the electronic text message to the supervisory system. If a workstation is used by several employees, the email or instant messaging program may identify the source of the electronic text message by requiring, for example, the employee to log on to the network with a secure password or with biometric measurements.

When receiving an email or instant message, the employee may be identified as the target of the electronic text message by the email or instant messaging program. Similarly, the source of the email or instant message, which is received by an employee, may be identified by the email or instant messaging program and accessed by the supervisory system.

Sources and targets of electronic text messages that are not employees of the enterprise may also be identified as persons outside of the enterprise or as persons outside of the enterprise, who are associated with a particular group, for example, an employee of a competitor or an employee of a government agency. The supervisory system, after accessing these outside sources, may use a code to represent, for example, an outside source or an outside source associated with a particular group in the memory storage of the system.

After associating the organizational information with a target and a source of an electronic text message, the supervisory system may store the organizational information pertaining to the target and the source of the electronic text message, as metadata with the electronic text message.

An exemplary embodiment of the invention may associate an identified source and an identified target with one or more communication screens determined by the organizational information. The identified source and the identified target of the electronic text message are associated by the organizational information stored in the supervisory system. Based on the organizational information associated with the identified source and the identified target, one or more communication screens are invoked to screen communication between the identified source and the identified target, according to a set of rules determined by administrators of the supervisory system for each of the invoked communication screens.

The various communication screens and their associated rules are defined by the administrators of the supervisory system according to the policies, regulations, and laws that apply to the enterprise's communications in an exemplary embodiment of the invention.

When, for example, a communication screen between a source and a target is invoked, the communication screen analyzes the context of the electronic text message according to the set of defined rules. A rule may comprise any of a keyword, an entity, or a pattern of text that is extracted from the electronic text message by an analysis engine of the supervisory system. For example, a rule may look for the keyword, "recommendation". The rule may further analyze the keyword, "recommendation", by looking for a stem of the keyword, for example, "recommend", as is well known in the art. The rule may yet further analyze the stem, "recommend", to look for various parts of speech, for example, "recommended" or "recommending", as is also well known in the art.

In an exemplary embodiment of the invention, a rule may also look for synonyms, hypernyms, and hyponyms of keywords by accessing a dictionary, which may be internal or external to the supervisory system. For example, the keyword, "equity", may be a synonym to the word, "stock". For example, the keyword, "transaction", denotes all the things that are separately denoted by the words "sell", "buy", "acquisition", and "merger" and is therefore a hypernym of each of these words. Conversely, the words "sell", "buy", "acquisition", and "merger" are hyponyms of "transaction".

Within the electronic text message, entities are also analyzed by the analysis engine in an exemplary embodiment of the invention. For example, "IBM", "International Business Machines Corporation", "Big Blue", and "Armonk" (Armonk, N.Y., USA is the site of IBM headquarters) may all be recognized as the same organizational entity. Business entities may also be recognized, for example, by their stock symbols or by commonly used identifying terms. Entities may also include individuals, for example, employees of the enterprise.

In an exemplary embodiment of the invention, a rule may also encompass a pattern of text. For example, a rule may look for multiple keywords in an electronic text message, for example, "IBM", "recommend", and "buy". The rule may further analyze the context of the electronic text message by determining whether the keywords, "IBM", "recommend", and "buy", or their synonyms/hypernyms/hyponyms are found within a sentence.

In an exemplary embodiment of the invention, rules may, for example, be associated with a numerical weight that indicates how confidently the matched rule provides the information that is sought. For example, in a numerical scale of from 0 to 1.0, a rule seeking to match the entity "IBM" may score 1.0 to the analysis of "Big Blue" in an electronic text message, while only 0.5 to the analysis of the phrase "a Fortune 100 information company".

If, for example, a particular rule is matched to a sentence, the remaining sentences of the electronic text message may not be analyzed according to the particular rule in order to speed analysis. Thus, a rule may be matched to the entire electronic text message. Each matching rule may then be stored with the electronic text message as metadata by the supervisory system in an exemplary embodiment of the invention.

Rules, for example, may also dynamically substitute words or terms, depending on external contextual information associated with the electronic text message. For example, the word, "today", may be substituted with "Jun. 1, 2009", or the phrase "my boss" with the identity of the employee's supervisor, which may be obtained from the supervisory system and its memory storage, which contains the organizational information, in an exemplary embodiment of the invention.

The supervising of electronic text messages, by an exemplary embodiment of the invention, comprises the acquisition and analysis of information in several increments. Initially, organizational information may be associated with the identified source and the identified target of the electronic text message, which may be stored as metadata associated with the electronic text message. One or more communication screens may then be invoked between the source and the target, and analysis by the set of rules determined by the invoked one or more communication screens may result in additional metadata, comprising matched rules, to be associated with the electronic text message.

Another increment of information acquisition and analysis may include the logical combination of rules to form a data construct, representing evidence that is searched for in communications between an identified source and an identified target, which invokes a particular communication screen. One such data construct, called an evidence category, $E_i$, may represent the logical or Boolean combination of several rules to describe a common evidence category. For example, assume that analysis of an electronic text message matches the following two rules for a screened communication between a member of the equity research department and a broker, $R_1$: a communication about the selling of stock, and $R_2$: a communication about a future private meeting. These two rules, for example, may be combined to form the evidence category, E, "a private discussion about the selling of stock," that is, $E=R_1+R_2$.

In an exemplary embodiment of the invention, as explained above, rules may be numerically weighted to indicate a measure of confidence for the matched rule providing the sought after information. Hence, an evidence category may also have a score. In the example above, the matched rule, $R_1$, a communication about the selling of stock, may be scored 1.0, while the matched rule, $R_2$, based on the analysis of "let's meet at Horner's sandwich shop" in the suspect electronic text message, may be scored 0.5. An exemplary embodiment of the invention may assign an evidence category score to be the highest score among all of the matched rules in order to limit the evidence category score to a range from 0 to 1.0.

From the example given above, the evidence category sought was that of "a private discussion about the selling of stock." The matched rule, $R_1$, communicating about the selling of stock, was scored 1.0, and the matched rule, $R_2$, based on the analysis of "let's meet at Horner's sandwich shop" in the suspect electronic text message, was scored 0.5. Therefore, the evidence category comprising the combination of matched rules, $R_1$ and $R_2$, may be scored 1.0, that is, the highest score among the matched rules in an exemplary embodiment of the invention.

Another increment of information acquisition and analysis may, for example, include the combination of one or more evidence category scores to form a compliance class and a corresponding supervisory score for the compliance class. In an exemplary embodiment of the invention, one or more compliance classes and their corresponding supervisory scores, as defined by the administrators of the supervisory system, may be associated with one or more corresponding communication screens, which are determined by the organizational information for an identified source and an identified target of the electronic text message. A compliance class may, for example, be defined to include one or more evidence category scores combined in various arithmetic, logical or Boolean combinations.

Combining non-zero evidence category scores, limited to a range from 0 to 1.0, may, for example, be accomplished by averaging the non-zero evidence category scores to provide a supervisory score associated with a particular compliance class in an exemplary embodiment of the invention. For example, the evidence category, $E_1$: "a private discussion about selling stock" and another evidence category, $E_2$: "future price trends of certain stocks" may be combined by averaging their scores to provide a supervisory score for the exemplary compliance class, SUSPICIOUS, where the score of the compliance class SUSPICIOUS has been pre-defined by the administrators of the supervisory system to be: $\text{Score}_{SUSPICIOUS} = (\text{score}(E_1) + \text{score}(E_2))/2$.

For another compliance class, the associated supervisory score may be determined, for example, by a logical or Boolean expression in an exemplary embodiment of the invention. For example, the compliance class, QUESTIONABLE, and its associated supervisory score, $\text{Score}_{QUESTIONABLE}$, may be defined by the system administrators as: $\text{Score}_{QUESTIONABLE} = (\text{score}(E_3) \text{ or } \text{score}(E_4)) = \text{MAX}(\text{score}(E_3), \text{score}(E_4))$, where $E_3$ represents the evidence category of "communication with analyst about content of research report" and $E_4$ represents the evidence category of "communication with analyst about investment banking business".

Thus, supervisory scores may, in an exemplary embodiment of the invention, be limited to a range of 0 to 1.0.

As explained above, each of the one or more communication screens, which are invoked by the organization information associated with a source and a target, analyzes an electronic text message by one or more pre-defined compliance classes to determine the one or more corresponding supervisory scores. The one or more compliance classes and their associated supervisory scores may then be stored with the electronic text message as metadata.

An electronic text message analyzed according to the compliance class, for example, $C_{SUSPICIOUS}$, with an associated supervisory score above a pre-defined threshold, may be subject to supervisory action in an exemplary embodiment of the present invention. Such supervisory action may include, for example, blocking transmission of the electronic text message, redirecting the text message to a supervisor or to a supervisory file, which is reviewed by a supervisor, and copying the electronic text message to the supervisory file.

FIG. 1 schematically illustrates a flow diagram of an exemplary embodiment of the invention. A method of supervising electronic text messages in an enterprise 100 comprises: storing organizational information, related to the enterprise 110; storing one or more communication screens that screen the electronic text messages, each of the one or more communication screens applying a set of rules to analyze the electronic text message, the set of rules being determined by the organizational information 120; identifying a source and a target of the electronic text message 130; invoking the one or more communication screens between the identified source and the identified target, each of the one or more invoked communication screens being determined by the organizational information for the identified source and the identified target 140; analyzing the electronic text message by the set of rules corresponding to the invoked one or more communication screens to provide a supervisory score 150; and applying supervisory action to the electronic text message based on the supervisory score, the supervisory action including any of blocking transmission of the electronic text message, redirecting the electronic text message to a supervisor or a supervisory file, and copying the electronic text message to the supervisory file 160.

Figure 2:
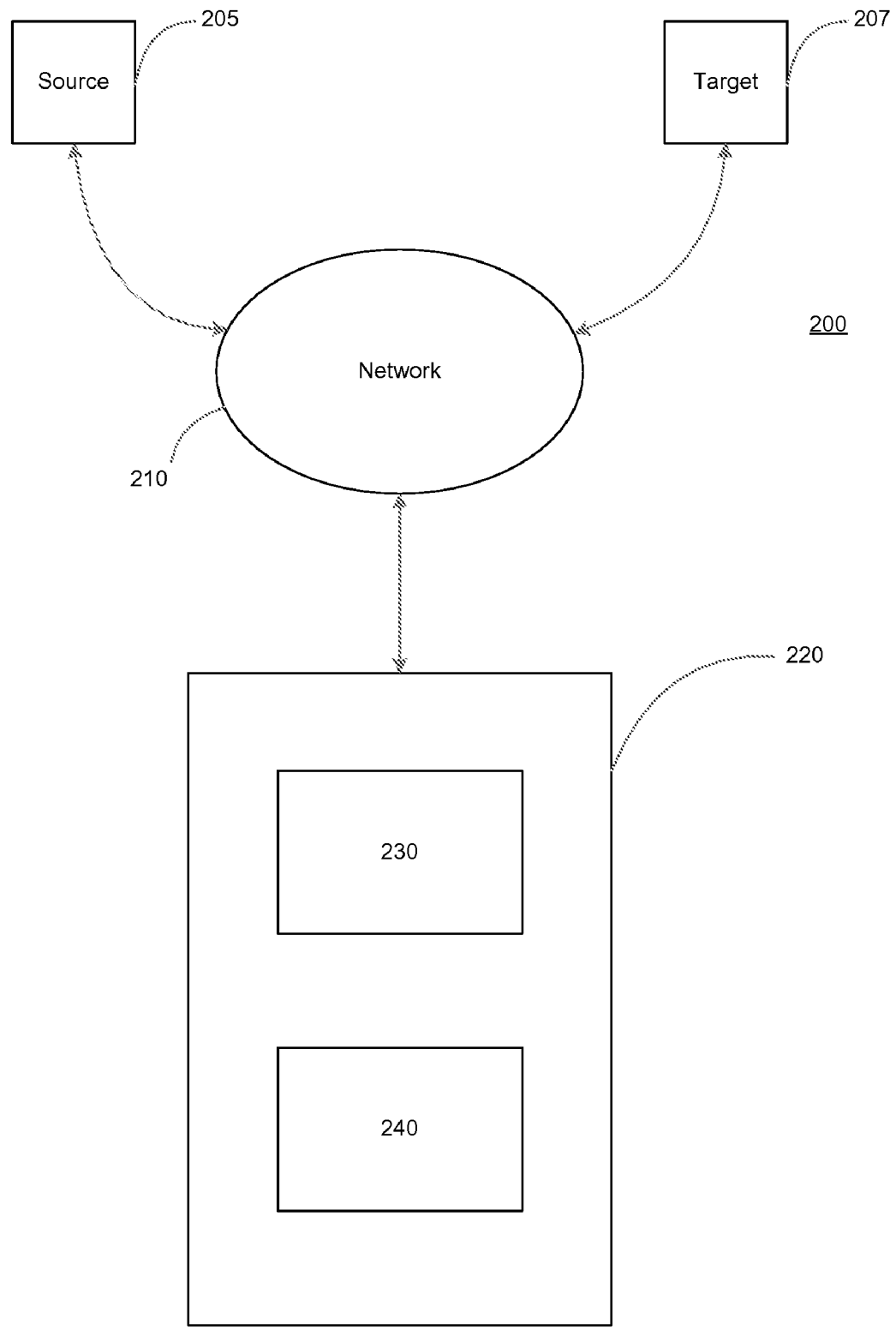
FIG. 2 is a schematic diagram illustrating a supervisory system for supervising electronic text messages in an enterprise in an exemplary embodiment of the invention.

FIG. 2 schematically illustrates a system for supervising electronic text messages in an enterprise. The system 200 may include a source workstation 205 and a target workstation 207 connected to a supervisory system 220 by a network 210.

The supervisory system 220 may include a memory 230 for storing organizational information related to the enterprise and for storing one or more communication screens that screen electronic text messages.

An analysis engine 240 of the supervisory system 220 may identify a source and a target by accessing an electronic text messaging system; determine, by the organizational information, a set of rules to be applied to the one or more communication screens to analyze the electronic text message; invoke the one or more communication screens between the identified source and the identified target, each of the one or more invoked communication screens being determined by the organizational information for the identified source and the identified target, analyzing the electronic text messages by a set of rules corresponding to the invoked one or more communication screens to provide a supervisory score; and applying supervisory action to the electronic text message, based on the supervisory score, in which the supervisory actions may include any of blocking transmission of the electronic text message, redirecting the electronic text message to a supervisor or a supervisory file, and copying the electronic text message to the supervisory file.

Figure 3:
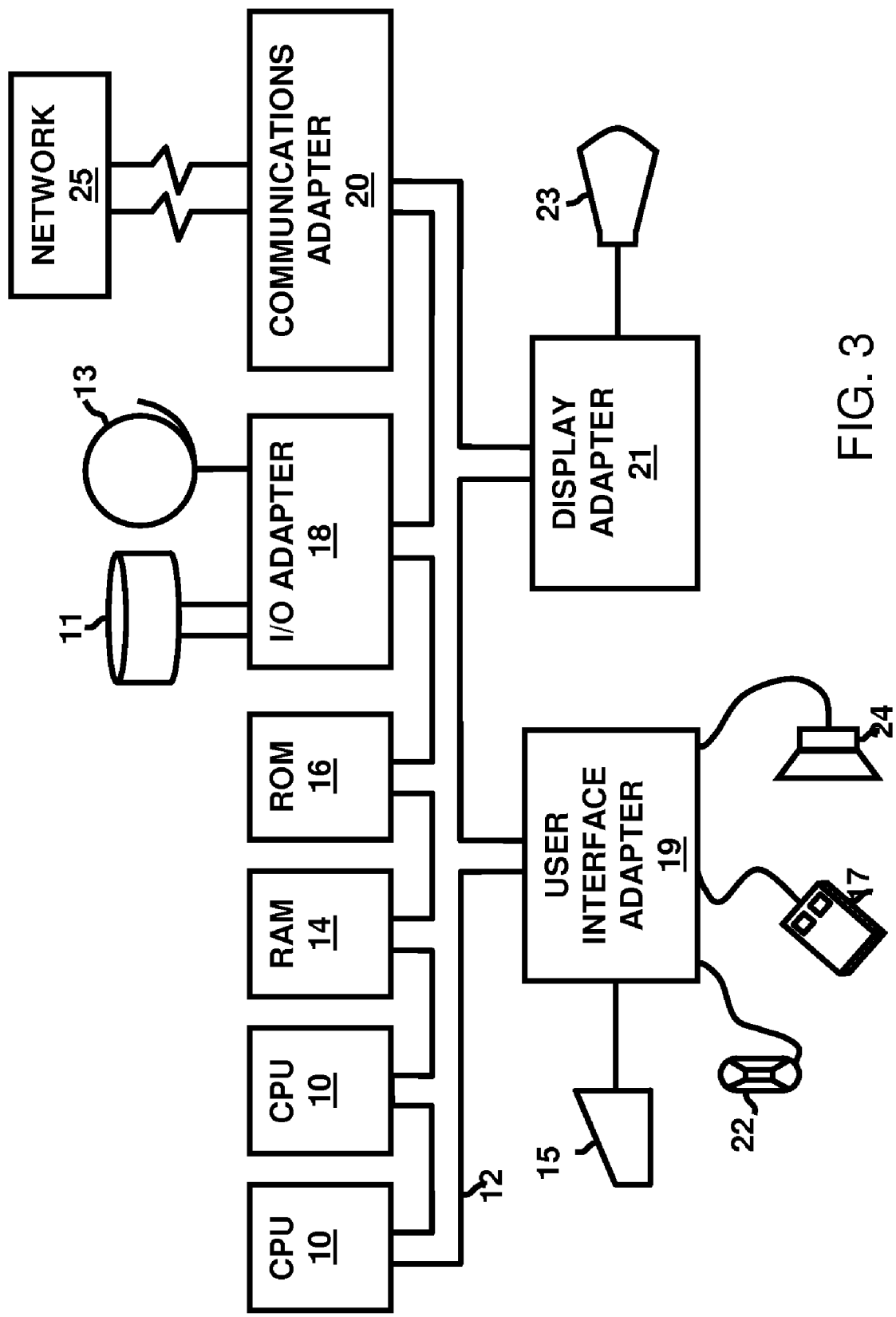
FIG. 3 is a schematic of a system upon which embodiments herein can operate.

A representative hardware system and structure for practicing an exemplary embodiment of the invention is depicted in FIG. 3. This schematic drawing illustrates an exemplary hardware configuration of an information handling/computer system in accordance with the exemplary embodiment of the invention. This system may include at least one processor or central processing unit (CPU) 10. The CPUs 10 may be interconnected via a system bus 12 to various devices such as a random access memory (RAM) 14, read-only memory (ROM) 16, and an input/output (I/O) adapter 18. The I/O adapter 18 may connect to peripheral devices, such as disk units 11, tape drives 13, or other program storage devices that are readable by the system. The system may read the inventive instructions on the program storage devices and follow these instructions to execute the methodology of the invention. A user interface adapter 19 may connect a keyboard 15, mouse 17, speaker 24, microphone 22, and/or other user interface devices to the bus 12 to gather user input. In addition, a communication adapter 20 may connect the information handling system to a data processing network 25, and a display adapter 21 may connect the bus 12 to a graphical user interface (GUI) 23 or other similar output device.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method of supervising an electronic text message in an enterprise, said method comprising:

storing, by a computer, organizational information, related to said enterprise;

storing, by said computer, one or more communication screens that screen electronic text messages, each of said communication screens applying a set of rules to analyze said electronic text message, said set of rules being determined by said organizational information;

wherein each of said rules of said set of rules comprises an entity identification, and any of a keyword and a pattern of text in said electronic text messages, and wherein a matched rule has a numerical value, within a fixed range, corresponding to a relative value of truth for said matched rule;

identifying, by said computer, a source and a target of said electronic text message;

invoking, by said computer, said one or more communication screens between said identified source and said identified target, each of said one or more invoked communication screens being determined by said organizational information for said identified source and said identified target, wherein said organizational information includes an identity of an employee and a workstation that said employee has access to, and any of a department in which said employee works, and special projects to which said employee is assigned that may have temporary communication restrictions that apply to said employee;

analyzing, by said computer, said electronic text message by said set of rules corresponding to said invoked one or more communication screens to provide a supervisory score, wherein said analyzing further comprises:

combining one or more matched rules to provide an evidence category, said evidence category having an evidence category score, corresponding to a highest numerical value of said one or more matched rules; and combining one or more evidence categories to provide one or more compliance classes, each of said one or more compliance classes having a supervisory score that is limited to a fixed numerical range, according to one of logical and arithmetic operations performed on said combining of one or more evidence category scores; and outputting, by said computer, said electronic text message, based on said supervisory score, to a supervisory file for review by a supervisor.

2. The method of claim 1, wherein said electronic text message comprises one of an email, an instant message, and a Voice over Internet Protocol (VoIP) transcript.

3. The method of claim 1, wherein said source is an employee of said enterprise and said target is another employee of said enterprise or a non-employee.

4. The method of claim 1, further comprising storing, by said computer, said organizational information and said supervisory score as metadata with said electronic text message.

5. A system for supervising electronic text messages in an enterprise comprising:

a source workstation and a target workstation connected to a supervisory system by a network;

said supervisory system comprising:

a memory for storing organizational information related to said enterprise and for storing one or more communication screens, each of said communications screens applying a set of rules to analyze said electronic text messages, wherein each of said rules of said set of rules comprises an entity identification, and any of a keyword and a pattern of text in said electronic text messages, and wherein a matched rule has a numerical value, within a fixed range, corresponding to a relative value of truth for said matched rule; and an analysis engine configured to:

identify a source and a target by accessing an electronic text messaging system;

determine, by said organizational information, a set of rules to be applied to said one or more communication screens to analyze said electronic text message;

invoke said one or more communication screens between said identified source and said identified target, each of said one or more invoked communication screens being determined by said organizational information for said identified source and said identified target, wherein said organizational information includes an identity of an employee and a workstation that said employee has access to, and any of a department in which said employee works, and special projects to which said employee is assigned that may have temporary communication restrictions that apply to said employee;

analyze said electronic text message by said set of rules corresponding to said invoked one or more communication screens to provide a supervisory score, wherein analyzing said electronic message further comprises configuring said analysis engine to:

combine one or more matched rules to provide an evidence category, said evidence category having an evidence category score, corresponding to a highest numerical value of said one or more matched rules; and combine one or more evidence categories to provide one or more compliance classes, each of said one or more compliance classes having a supervisory score that is limited to a fixed numerical range, according to one of logical and arithmetic operations performed on said combining of one or more evidence category scores; and output said electronic text message, based on said supervisory score, to a supervisory file for review by a supervisor.

6. The system of claim 5, wherein said memory stores said organizational information and said supervisory score as metadata with a stored electronic text message.

7. A non-transitory computer-readable program storage medium readable by computer, tangibly embodying a program of instructions executable by said computer to perform a method of supervising electronic text messages in an enterprise, said method comprising:

storing organizational information related to said enterprise;

storing, by said computer, one or more communication screens that screen electronic text messages, each of said communication screens applying a set of rules to analyze said electronic text message, said set of rules being determined by said organizational information;

wherein each of said rules of said set of rules comprises an entity identification, and any of a keyword and a pattern of text in said electronic text messages, and wherein a matched rule has a numerical value, within a fixed range, corresponding to a relative value of truth for said matched rule;

identifying a source and a target of said electronic text message;

invoking one or more communication screens between said identified source and said identified target, each of said one or more invoked communication screens being determined by said organizational information for said identified source and said identified target, wherein said organizational information includes an identity of an employee and a workstation that said employee has access to, and any of a department in which said employee works, and special projects to which said employee is assigned that may have temporary communication restrictions that apply to said employee;

analyzing said electronic text message by a set of rules corresponding to said invoked one or more communication screens to provide a supervisory score, wherein said analyzing further comprises:

combining one or more matched rules to provide an evidence category, said evidence category having an evidence category score, corresponding to a highest numerical value of said one or more matched rules; and combining one or more evidence categories to provide one or more compliance classes, each of said one or more compliance classes having a supervisory score that is limited to a fixed numerical range, according to one of logical and arithmetic operations performed on said combining of one or more evidence category scores; and outputting said electronic text message, based on said supervisory score, to a supervisory file for review by a supervisor.

* * * * *